United States Patent [19]
Stephansen

[11] Patent Number: 5,746,983
[45] Date of Patent: May 5, 1998

[54] APPARATUS AND PROCESS FOR CALCIFICATION

[76] Inventor: Poju R. Stephansen, P.O. Box 103 - Lilleaker, N-0216 Oslo, Norway

[21] Appl. No.: 299,060

[22] Filed: Aug. 31, 1994

[30] Foreign Application Priority Data

Aug. 31, 1993 [NO] Norway .................................. 933084

[51] Int. Cl.$^6$ ........................................................ C01B 6/04
[52] U.S. Cl. .......................... 422/162; 422/225; 422/232; 423/640
[58] Field of Search ................................ 422/162, 225, 422/232, 269, 902; 423/640

[56] References Cited

U.S. PATENT DOCUMENTS

| | | | |
|---|---|---|---|
| 2,611,683 | 9/1952 | Knibbs | 422/162 X |
| 3,573,002 | 3/1971 | Zimmerman et al. | 422/162 |
| 3,650,890 | 3/1972 | Kamio . | |
| 5,016,686 | 5/1991 | Gerstenkorn | 141/96 |

FOREIGN PATENT DOCUMENTS

| | | | |
|---|---|---|---|
| 184683 | 7/1966 | U.S.S.R. | 422/162 |
| 83/02109 | 6/1983 | WIPO | 422/162 |

*Primary Examiner*—Robert J. Warden
*Assistant Examiner*—Leigh Dawson
*Attorney, Agent, or Firm*—Sherman and Shalloway

[57] ABSTRACT

Improved device for slaking of lime, comprising a slaker (10) which is connected to a lime silo (24) and a conveyor (30) for supply of lime, equipped with a motor driven mixer (14) with a specially designed mixing organ. Through pipeline with exit valve the slaker is connected to a distribution tank. An improved process for slaking of lime, using the above-mentioned device and process steps comprising transfer of lime under conveyor (30) from the silo (24) for feeding in weighed quantities into the slaker (10), feeding of weighed water quantities into the slaker for treatment in intervals by means of the mixer (14) and subsequent transfer of the finished lime mixer into the distribution tank. The slaking process is automated and takes place under constant supervision, and the slaking device's regulating valves are controlled by respective, connected limit switches.

10 Claims, 2 Drawing Sheets

5,746,983

APPARATUS AND PROCESS FOR CALCIFICATION

FIELD OF THE INVENTION

The subject invention concerns preparation for calcification, and in particular a device and process for slaking of lime.

BACKGROUND OF THE INVENTION

Lime slaking devices of different types have been in use for a long time. Most of these have been designed for continuous, controlled operation, for instance slakers of the following brands: "W & T", "Don Oliver" and "BIF". Possibly, slakers for operation in intervals are also used.

Slakers for continuous use have several drawbacks, for instance they are difficult to control, they require extensive inspections and maintenance, and are not well suited for computer control operation. Further, they are costly to manufacture.

Accordingly, one of the purposes of this invention is to make an automatically controlled calcification device for operation in intervals.

Another purpose of the invention is to improve the process of lime slaking in intervals, using the device according to this invention.

The above-mentioned purposes are achieved by use of the device and process according to the invention, as described below, with reference to the enclosed drawings, where the drawings show a schematic cross section of the apparatus according to the invention and a detail of a mixing disk used therein.

DETAILED DESCRIPTION OF THE INVENTION

Figure 1:
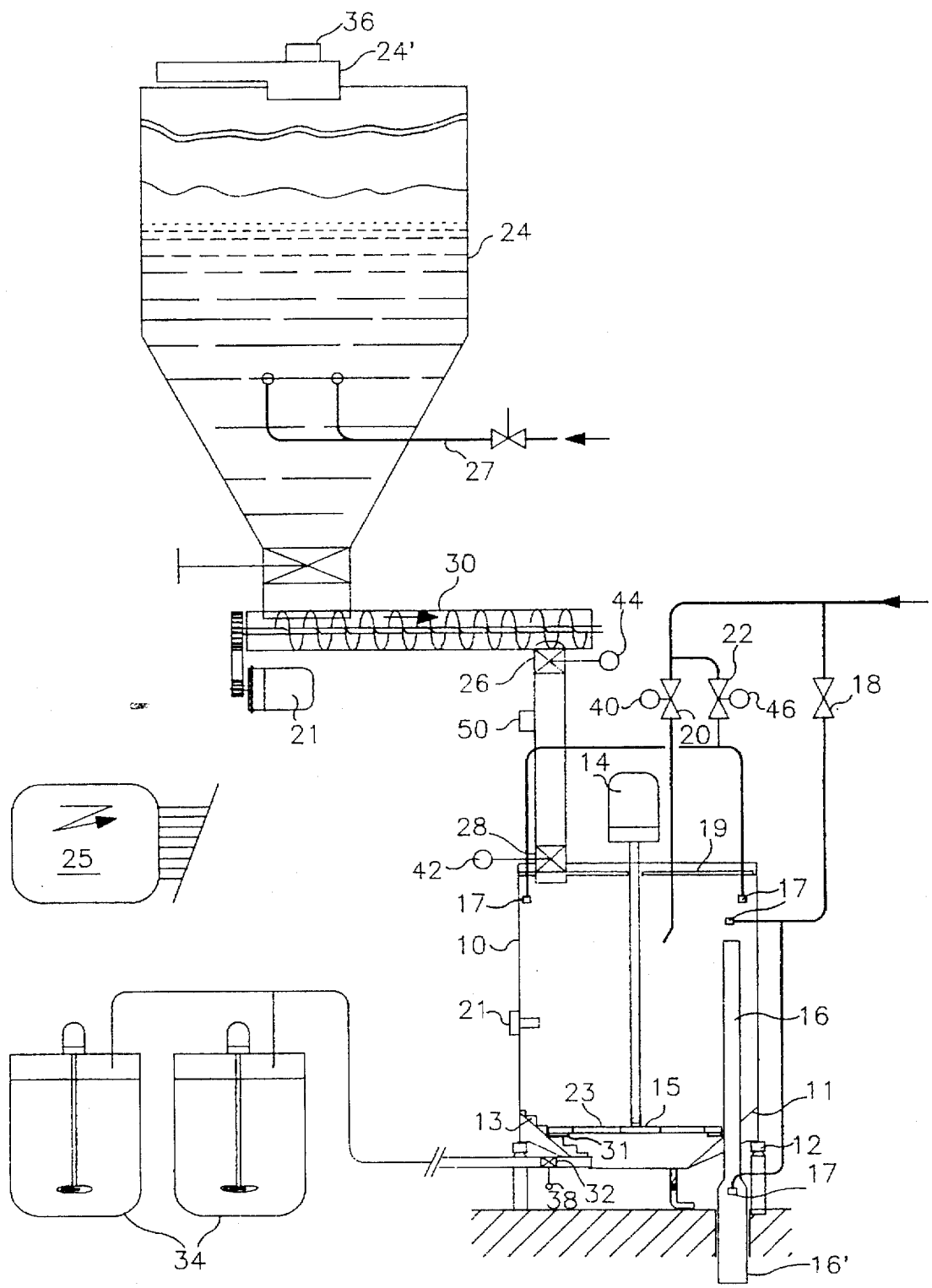
FIG. 1 is a schematic cross section of the apparatus of the invention.
Figure 2:
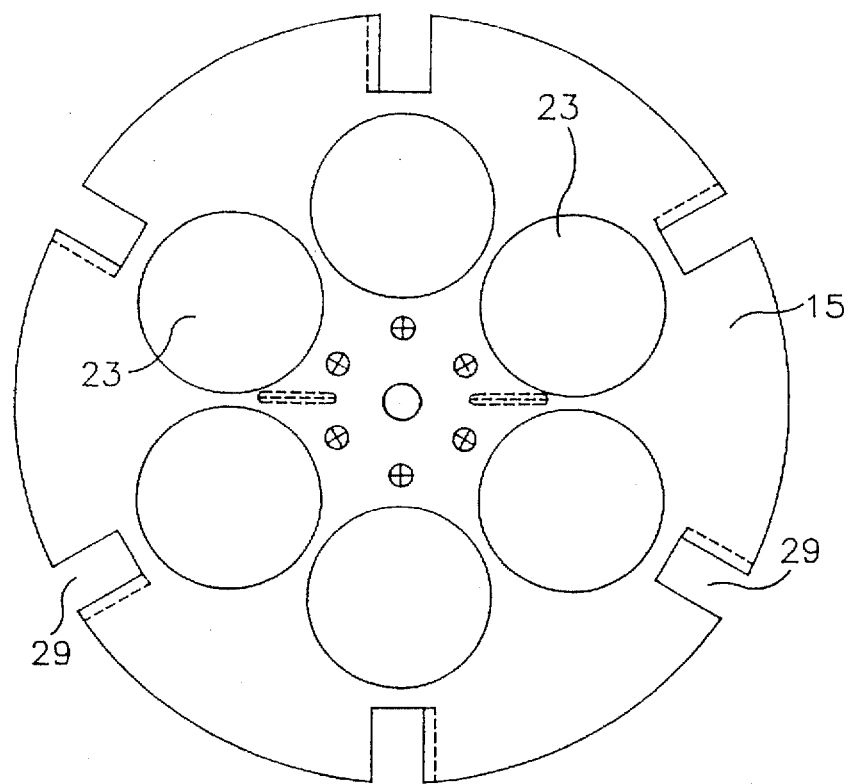
FIG. 2 is a planar view of the mixing disk used in the apparatus of the invention.
Figure 3:
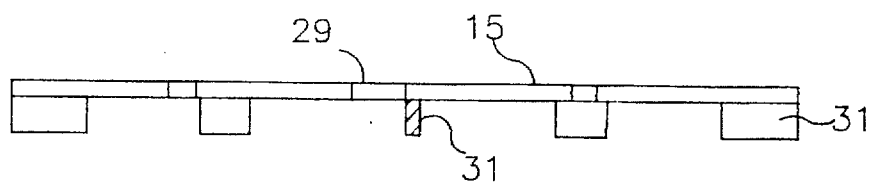
FIG. 3 is a side view of the mixing disk of FIG. 2.

The calcification device according to the invention is of the interval type, branded as "PRS-interval slaker" or "PRS-batch slaker," comprising a slaker 10, mounted on one or more weighing cells 12 for intermittent weighing of lime and water. The slaker 10 is equipped with a powered, remote controlled mixer 14 having a tachometer, and a specially designed, injector equipped, water jet dust suction device 16, which also functions as an overflow device. Water is fed to the dust suction device 16 through a pipeline equipped with a valve 18, and to the slaker 10 through a pipeline with valves 20 and 22.

The slaker 10 is cylindrical with an internal diameter of, for instance, approximately 1.2 meters and a conical bottom section 11 with a slant of approximately 25° which inside diameter approximately equals one-half the slaker's diameter. The bottom section 11 is equipped with saw toothed teeth 13 for creating turbulence. The mixer 14 comprises a specially designed, circular and disk formed mixer organ 15 of approximately the same diameter as the slaker bottom and has a number of relatively large holes 23 arranged in an inner circular pattern taking up approximately 25% of the mixer organ's total surface. A corresponding number of evenly distributed tracks 29 are located at the disk edge, where an edge of each track has a raised blade 31 for fitting into the turbulence teeth 13 in the bottom section of the slaker. The mixer organ 15 is pivotally attached at a distance over the bottom of the slaker, of approximately 5% of the slaker's total height.

Within the slaker 10 are arranged one or more fluid jets 17 for cleaning of the overflow pipe 16 and for flushing of the inside slaking components prior to each filling, in order to prevent formation of crusts, thereby reducing the cost of maintenance. The outer end 16' of the overflow pipe 16 has been expanded, and equipped with one or more jets 17, which arrange for air ventilation. The slaker 10 has a cover 19 with a specially designed throttle valve 28, which prevents water leaks when the inside of the slaker is flushed, and which also separate the wet and dry zones of the lime. The throttle valves 26 and 28 are linked to the cover 19.

The slaker 10 is coupled to a lime silo 24, which has a volume of, for instance, 75 cubic meters. The silo 24 is equipped with level gauges for indication of, respectively, high, ordered (normal), and low, levels in the silo, as well as ventilation filter 24', with an area of about 15 square meters. It is driven by a motor 36, preferably with a safety switch and control switch (automatic/manual), for mechanical cleaning of the filter.

A screw conveyor 30 for feeding lime to the slaker is mounted between the lime silo 24 and the slaker 10. The motor 21 for operation of the conveyor is preferably equipped with a safety switch and operation switch (automatic/manual).

Through pipeline with an exit valve 32, the slaker 10 is connected to a distribution tanks 34 for the slaked lime.

The slaking device according to the invention is automated, and well suited for computerized 25 operation. Due to the previously described and specially designed bottom section of the slaker, with the inside components, it is possible to slake small quantities compared to the slaker's total volume, something which is beneficial with a view to obtaining an end product with relatively low lime concentrations.

By means of the mixing organ of the beforementioned design, a small and highly viscous lime slurry quantity, with a temperature near its boiling point, may be kept homogenous, without air suction or formation of the threshold zones, with blow-out tendencies.

When practicing the improved process according to the invention, and using the aforementioned, new device, the lime silo 24 is filled with lime through a blow pipe 27 from a tank truck. The filter motor 36 is started and stops automatically after about three minutes. The required amount of water previously weighed, is filled into the slaker 10, whereafter a previously decided and weighed amount of lime is injected into the slaker 10 from the lime silo 24 by help of conveyor 30. A Pt-100 element 21 supervises the temperature in slaker 10 during the slaking process. The proportion between previously decided weights of water and lime, therefore, determines both concentration and temperature. The final concentration depends on the said, last amount of water.

The prepared lime is transported through the pipeline with its exit valve 32 to the distribution tank 34. The valve 32 is closed in advance by means of a limit switch 38.

The slaking process is controlled in intervals, whereby the valve 20, after closing of the exit valve 32, receives impulses for opening, and thereafter for closure when the determined amount of water has been filled into the slaker 10. The valve setting is controlled by a limit switch 40. The control system registers the actual weight of the water volume after additional running, and adjusts the level (WSHH), which is important in order to avoid that the amount of chemicals to be added, is insufficient.

The throttle valve 28 in the slaker's cover receives an impulse, and is opened by control of limit switch 42.

At the same time, an impulse for opening of valve 18, and dust suction device 16 is started. Approximately 10 seconds after opening of valve 28, valve 26 by the exit part of the conveyor 30 receives an impulse, and is opened under control of limit switch 44. The mixer 14 is started at the same time, and a tachometer indicates whether or not the mixer functions. If throttle valves or other valves have not been opened as assumed, or if the mixer 14 does not rotate, an alarm signal is emitted. In the latter case valve 22 is open, so that the slaker 10 is filled completely and the process is stopped.

Approximately 5 seconds after opening of valve 26, the conveyor 30 is started, together with a clock for measuring of normal dosage time, for instance 4 minutes. If this time is exceeded, the sledge motor starts, and is kept running for as long as the conveyor 30, limited to approximately 300 seconds, whereafter conveyor and sledge motors are stopped, and an alarm signal is emitted.

The conveyor 30 runs until desired and weighed amount of lime has been supplied. The amount of chemicals is added to the adjusted amount of water. Valve 26 is closed under control of limit switch 44 approximately 5 seconds after the conveyor 30 stops, and the magnet valve 50 is activated for supply of air to the exit vibrator for approximately 3 seconds. Valve 28 is closed by means of limit switch control 42 approximately 20 seconds after valve 26. If the valves are not closed as anticipated, an alarm signal is emitted.

Approximately 20 seconds after closure of valve 28, an impulse for closure of valve 18 is emitted, and the dust suction device 16 is stopped. After the conveyor 30 is stopped, a desired and adjustable period for slaking, for instance 15 minutes, is started. The period chosen, and its progress, is preferably indicated for the operator.

The slaking temperature, which is supervised by a Pt-100 element 21, should be stabilized at around 75°–80° C. during the slaking period. If the temperature exceeds approximately 90° C., water is added through valve 20, until the temperature falls to the preset level. If the temperature has not fallen below approximately 90° C. after approximately 60 seconds, valve 22 is also opened, and the slaker is filled completely with water, the process being interrupted and an alarm signal emitted.

If the temperature of the slaker does not reach 75° C. during the slaking period, the amount of water in the following quantities is reduced by for instance, approximately 3 kg, at unchanged amount of lime.

After the slaking period is ended, valve 22 is opened by control of limit switch 46, for addition of water for dilution. When the required amount of water has been added, valve 22 is closed, and exit valve 32 is opened by means of limit switch 38.

When the level in the slaker 10 is below the required level of water, the mixer is stopped. When the slaker 10 is empty, a standstill period of approximately 20 seconds duration begins, before a new slaking process is started.

When using the device according to the process of the invention, a number of steps are taken, whereby:

the slaker is first flushed with the amount of water required for slaking of one quantity, thereby inside cleaning is also performed;

the amount of lime for each quantity is maintained unchanged, the temperature of the slaking process is monitored and registered;

when the slaking temperature becomes too low, arrangements are taken for an increase in the amount of water for the following quantity;

when the slaking temperature becomes too high, arrangements are taken for reduction of the amount of water in the following quantity;

additional water is added into the slaker when the temperature becomes critical, in order to achieve reduced temperature, and if the temperature should not fall, the slaker is filled completely with water and stops;

the slaker is filled with thinning water to the upper level after completion of slaking, whereby a higher degree of repetitive accuracy is achieved.

Through the use of the new device and process according to the invention related to lime slaking important advantages are achieved, some of which are:

a lime slurry with a highly accurate concentration is manufactured, changing water quality and water temperature have small effects on the slaker's function, changing lime quality and degree of granulation insignificantly influences the slaker's functions, the slaker is, as opposed to other known systems, well suited for computerized operation, and by simple changes, the slaker may be used for manufacturing of hydrate lime.

EXAMPLE

1. Check if slaker 10 is empty.
2. Close exit valve 32.
3. Check limit switch 38 to determine whether exit valve 32 is closed.
4. By positive answer: open water valve 20.
5. Check limit switch 40 to determine whether water valve 20 is open.
6. Water valve 20 is closed when preset amount of water is weighed and fed according to weighing cell 12. The control system adjusts weighing cell 12 to actual value.
7. Check limit switch 40 to determine whether water valve 20 is closed.
8. Open throttle valve 28.
9. Check limit switch 42 to determine whether throttle valve 28 is open.
10. By positive answer: open valve 18 so that dust suction device 16 is started.
11. Open throttle valve 26 10 seconds after confirmation from limit switch 42 and start mixer 14.
12. Check limit switch 44 to determine whether throttle valve 26 is open and tachometer to determine whether mixer 14 has started.
13. Start screw conveyor 30.
14. The screw conveyor starts a timer.
15. Is the normal feeding period exceeded?
16. By positive answer: sledge motor is started and runs as long as conveyor 30 moves, but is limited by time to 300 seconds.
17. Check weighing cells to determine whether preset amounts of lime are weighed and fed.
18. By positive answer: stop conveyor 30 and start adjustable time when conveyor 30 has stopped.

19. Close throttle valve 26 simultaneously with conveyor 30 receiving a stop impulse.

20. Check limit switch 40 to determine whether throttle valve 26 is closed.

21. By positive answer: open magnetvalve 50 for 3 seconds.

22. Close throttle valve 28 20 seconds after throttle valve 26 is closed.

23. Check limit switches 42 and 44 to determine whether the throttle valves 26 and 28 are closed.

24. Stop suction device 16 200 seconds after throttle valve 28 is closed by closing valve 18.

25. Is the mixing period exhausted?

26. By positive answer: open valve 20 for dilution water.

27. Check limit switch 40 to determine whether valve 20 is open.

28. Does level in slaker 10 exceed preset upper level?

29. By positive answer: close valve 20.

30. Check limit switch 40 to determine whether valve 20 is closed.

31. Open exit valve 32.

32. Check limit switch 38 to determine whether valve 32 is open.

33. Is level in slaker 10 under the level for the required amount of water?

34. By positive answer: stop mixer 14.

35. Is level in slaker 10 under preset lower level.

36. Await new start impulse from storage tank after pause of about 20 seconds.

I claim:

1. In an improved automatically driven, cylindrical lime slaking apparatus for interval manufacture of slaked lime comprising a lime silo for storage of dry, unslaked lime, a cylindrical slaker capable of receiving dry lime from said silo and mixing said lime with water in a hydration process, a conveyor mechanism joining the silo and slaker for transfer of dry lime from said silo to said slaker, and a water supply system supplying water to said slaker for the hydration process and for flushing said slaker between intervals of lime slaking, the improvement comprising mounting said slaker on one or more weighing cells and providing an automatic control means whereby the weight of lime and water introduced into said slaker and making up a slaking mixture are measured and provided to said control means to control the operation intervals of said slaker, conveyor mechanism and water supply system.

2. The apparatus of claim 1, wherein the improvement further comprises a slaker having a generally cylindrical body portion and a conical bottom section terminating in a level bottom having a diameter which is substantially one-half the diameter of the body portion, the conical bottom section being equipped with saw-toothed teeth, and said slaker having a motor driven mixer comprising a disk shaped mixing member having a diameter substantially that of the slaker bottom and having a plurality of holes arranged in a circular pattern thereabout taking up approximately 25% of the total surface area of the mixing member, whereby said mixing member and said saw-toothed teeth interact to create turbulence in the slaking mixture.

3. The improved apparatus of claim 2 wherein the mixing member is positioned at a distance above the bottom of the slaker which is approximately 5% of the total height of the slaker.

4. The improved apparatus of claim 3 wherein the mixing member further comprises a plurality of peripheral tracks at the disk edge, and wherein one edge of each track has a protruding blade which, when said mixing member rotates, interacts with said saw-toothed teeth whereby turbulence is created in the slaking mixture.

5. The improved apparatus of claim 1 wherein the slaker further comprises a water jet dust suction and overflow device comprising a pipe extending upward into said slaker and downward out of said slaker, the downward end of said pipe being expanded and equipped with at least one water jet which, when activated, creates a positive airflow downward in said pipe creating a suction within the upper portion of said pipe in said slaker whereby lime dust is drawn into said pipe from said slaker.

6. The apparatus of claim 1 wherein said slaker further comprises a cover through which said conveyor mechanism delivers lime from said silo, said conveyor mechanism comprising at least one throttle valve at said cover whereby lime passes from said conveyor mechanism into said slaker and which seals said conveyor mechanism from said slaker when said water supply system is activated.

7. An improved interval lime slaking apparatus comprising a lime storage silo, a slaker, a conveyor mechanism connecting said silo and said slaker, and an automatic control means; wherein said slaker comprises a generally cylindrical body portion and a conical bottom section terminating in a substantially level bottom having a diameter substantially one half the diameter of the body portion, a water jet dust suction and overflow mechanism, a water supply system including a plurality of water jets within said slaker and automatically operable water flow control valves regulated by said automatic control means, a thermal detection and monitoring element in said slaker and connected to said automatic control means, and a mixing apparatus, said slaker being mounted on at least one weighing cell connected to said automatic control means whereby quantities of lime and water introduced into said slaker are measured for each interval of slaking, said measurements being provided to said automatic control means whereby operation of said apparatus is regulated.

8. The apparatus of claim 7 further comprising throttle control valves at the slaker end of said conveyor mechanism separating said slaker from said conveyor mechanism whereby introduction of lime from said silo into said slaker is regulated in intervals and said conveyor mechanism is sealed off from said slaker during flushing of said slaker between intervals of introduction of lime thereby preventing entry of water into said conveyor mechanism during slaking and flushing of said slaker.

9. The apparatus of claim 8 further comprising a plurality of saw-toothed teeth in said conical bottom section of said slaker and wherein said mixing apparatus comprises a motor driven mixer disk having a diameter substantially equal to the level bottom of said slaker and positioned at a distance above said level bottom which is approximately 5% of the total height of the slaker, said disk having a plurality of holes therein arranged in a circular pattern and taking up approximately 25% of the total surface of the disk, said disk further having a corresponding number of blade members protruding therefrom which blade members interact with said saw-toothed teeth when said mixer is rotated, thereby creating turbulence within said slaking mixture.

10. The apparatus of claim 9 wherein said automatic control means comprises a computer which receives signals from said weighing cell and said thermal detection and monitoring element and, in response thereto, regulates the operation of said conveyor mechanism, said water flow control valves and said mixer whereby said lime slaking apparatus is operated at intervals for slaking lime separated by periods wherein slaked lime is removed to distribution tanks and said slaker is flushed.

* * * * *